US012655272B2

(12) United States Patent
Hostetter et al.

(10) Patent No.: US 12,655,272 B2
(45) Date of Patent: Jun. 16, 2026

(54) RHEOLOGY MODIFIER AND AMINOSILANE WATERBORNE ADMIXTURE

(71) Applicant: Rohm and Haas Company, Collegeville, PA (US)

(72) Inventors: Marisa Hostetter, Gilbertsville, PA (US); Yujie Lu, Blue Bell, PA (US); John J. Rabasco, Allentown, PA (US); Stephen D. Thompson, Harleysville, PA (US)

(73) Assignee: Rohm and Haas Company, Collegeville, PA (US)

( * ) Notice: Subject to any disclaimer, the term of this patent is extended or adjusted under 35 U.S.C. 154(b) by 672 days.

(21) Appl. No.: 17/922,664

(22) PCT Filed: Apr. 16, 2021

(86) PCT No.: PCT/US2021/027671
§ 371 (c)(1),
(2) Date: Nov. 1, 2022

(87) PCT Pub. No.: WO2021/242437
PCT Pub. Date: Dec. 2, 2021

(65) Prior Publication Data

US 2023/0167273 A1 Jun. 1, 2023

Related U.S. Application Data

(60) Provisional application No. 63/029,903, filed on May 26, 2020.

(51) Int. Cl.
*C08K 5/544* (2006.01)
*C09D 133/08* (2006.01)

(52) U.S. Cl.
CPC ............ *C08K 5/544* (2013.01); *C09D 133/08* (2013.01)

(58) Field of Classification Search
None
See application file for complete search history.

(56) References Cited

U.S. PATENT DOCUMENTS

| | | | | |
|---|---|---|---|---|
| 5,527,619 | A | 6/1996 | Rokowski et al. | |
| 2004/0068036 | A1 | 4/2004 | Halladay et al. | |
| 2013/0158194 | A1* | 6/2013 | Bobsein | C08G 18/791 524/590 |
| 2016/0237247 | A1* | 8/2016 | Hawkins | C09D 7/00 |
| 2017/0130072 | A1* | 5/2017 | McCulloch | C09D 171/02 |
| 2017/0275489 | A1* | 9/2017 | Balijepalli | C09D 7/63 |
| 2019/0077983 | A1* | 3/2019 | Bohling | E01F 9/576 |

FOREIGN PATENT DOCUMENTS

| | | | | |
|---|---|---|---|---|
| CN | 110229302 | A | 9/2019 | |
| EP | 0924230 | A1 | 6/1999 | |
| EP | 0924231 | A1 | 6/1999 | |
| EP | 2341111 | A2 | 7/2011 | |
| JP | 2018104298 | A * | 7/2018 | |
| WO | 2006032512 | A2 | 3/2006 | |
| WO | 2020076744 | A1 | 4/2020 | |
| WO | WO-2020076742 | A1 * | 4/2020 | C08F 220/18 |

OTHER PUBLICATIONS

ROPAQUE_Ultra (Year: 2021).*
Dow_Aculyn_46 (retrieved Oct. 10, 2025).*
Machine Translation of JP 2018104298 (Year: 2018).*
Ultrus _Rhoplex_SG-30 (retrieved Oct. 10, 2025).*

* cited by examiner

*Primary Examiner* — Callie E Shosho

(57) ABSTRACT

The present invention is a composition comprising an aqueous admixture of a neutralized or partially neutralized aminosilane and an associative thickener, wherein the admixture has a pH of less than 10.2. The admixture is beneficial as an easy-to-use paint additive that provides stain removal, stain blocking, and corrosion resistance for coatings from low VOC paints.

7 Claims, No Drawings

RHEOLOGY MODIFIER AND AMINOSILANE WATERBORNE ADMIXTURE

BACKGROUND OF THE INVENTION

The present invention provides an aqueous coating composition comprising an acid modified admixture of a hydrophobically modified alkylene oxide urethane rheology modifier and an aminosilane. The composition is useful for delivering hydrophilic stain removal performance and maintaining film appearance in the final dried coating.

Aminosilanes are a class of additives used in latex paints to improve adhesion, stain blocking, and corrosion resistance among other properties. However, when exposed to water, aminosilanes hydrolyze and condense to form polymeric siloxane species within minutes. Moreover, these reaction products are polycationic in the pH range of latex paints, thereby causing flocculation of the anionically stabilized latex. Flocculation can be mitigated by diluting the aminosilane in an organic solvent prior to addition; nevertheless, solvents are impractical for low VOC waterborne systems. Alternatively, the paint has to be carefully formulated to avoid flocculation, often to the detriment of other properties. Accordingly, it would be beneficial to have a simple and broadly applicable method of adding an aminosilane to a low VOC latex paint to provide formulators access to the improved performance.

SUMMARY OF THE INVENTION

In a first aspect, the present invention is a composition comprising an aqueous admixture of a) a neutralized or partially neutralized aminosilane and b) an associative thickener having a water soluble polymeric backbone with terminal or internal hydrophobic groups or both; wherein the weight-to-weight ratio of the neutralized or partially neutralized aminosilane to the associative thickener is in the range of from 1:30 to 5:1, and wherein the composition has a pH of less than 10.2.

In a second aspect, the present invention is a method comprising the step of contacting an aqueous admixture of a neutralized or partially neutralized aminosilane and an associative thickener comprising a water soluble polymeric backbone with terminal or internal hydrophobic groups or both, with a pre-paint to produce a composition having a concentration of the neutralized or partially neutralized aminosilane in the range of from 0.05 to 5 weight percent, and a concentration of the associative thickener in the range of from 0.2 to 10 weight percent. The composition of the present invention is useful for imparting thickening to a coating composition and improved stain removal from coatings prepared from the composition.

DETAILED DESCRIPTION OF THE INVENTION

In a first aspect, the present invention is a composition comprising an aqueous admixture of a) a neutralized or partially neutralized aminosilane and b) an associative thickener having a water soluble polymeric backbone with terminal or internal hydrophobic groups or both; wherein the weight-to-weight ratio of the neutralized or partially neutralized aminosilane to the associative thickener is in the range of from 1:30 to 5:1, and wherein the composition has a pH of less than 10.2.

The aminosilane is a compound that contains a primary, or a secondary, or a tertiary amino, or a quaternary ammonium group separated by 2 to 6 carbon atoms, preferably 3 carbon atoms, from an Si—O group or a group that is hydrolyzable to an Si—O group (such as an SiH or SiCl group). More preferably, the aminosilane is illustrated by the following structure I:

I

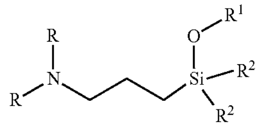

where each R is independently H, $C_1$-$C_3$-alkyl, phenyl, or 2-aminoethyl; $R^1$ is $C_1$-$C_3$-alkyl or $C(O)CH_3$; and each $R^2$ is independently H, $C_1$-$C_3$-alkyl, $C_1$-$C_3$-alkoxy, or O—$C(O)CH_3$. The aminosilane may also be a hydrolyzed product of the compound of structure I.

Examples of suitable aminosilanes include N-methylaminopropyltrimethoxysilane, N-2-aminoethyl-3-aminopropylmethyldimethoxysilane, aminopropyldimethylethoxysilane, N-2-aminoethyl-3-aminopropyltrimethoxysilane, N-3-aminopropylmethyldimethoxysilane, 3-aminopropyltriethoxysilane, 3-aminopropyltrimethoxysilane, and N,N-dimethylaminopropyltrimethoxysilane, as well as hydrolyzed products thereof. A preferred aminosilane is pre-hydrolyzed N-2-aminoethyl-3-aminopropyltrimethoxysilane, which is the reaction product of N-2-aminoethyl-3-aminopropyltrimethoxysilane and water.

Examples of suitable associative thickener backbones include polyether, polymethacrylamide, polysaccharide, or polyvinyl backbones, preferably, a polyether backbone. More preferably, the associative thickener is a hydrophobically modified alkylene oxide urethane polymer, most preferably a hydrophobically modified ethylene oxide urethane polymer (a HEUR). The hydrophobically modified alkylene oxide urethane polymer is advantageously prepared by contacting under reactive conditions a diisocyanate, a water-soluble polyalkylene glycol, and an amine or alcohol capping agent. A water-soluble polyalkylene glycol refers to water-soluble polyethylene glycols, water-soluble polyethylene oxide/polypropylene glycol copolymers, and water-soluble polyethylene oxide/polybutylene glycol copolymers.

The composition is advantageously prepared by first contacting an acid with an aqueous solution of the associative thickener, preferably the HEUR, then contacting the acidified associative thickener with the aminosilane to yield an admixture having a pH of less than 10.2, preferably less than 10.0, and more preferably less than 9.7; and preferably greater than 6.0, more preferably greater than 7.0, and most preferably greater than 8.0. The concentration of the associative thickener in the aqueous solution is preferably in the range of from 5, more preferably from 10, and most preferably from 15 weight percent, to 35, more preferably 30, and most preferably 25 weight percent, based on the weight of the associative thickener and water in the admixture. The concentration of the neutralized or partially neutralized aminosilane in the aqueous admixture is preferably in the range of from 0.2, more preferably from 0.5, more preferably from 1, and most preferably from 2 weight percent, to 20, more preferably to 15, and most preferably to 10 weight percent, based on the weight of the neutralized or partially neutralized aminosilane and water in the admixture.

The admixture of the associative thickener, preferably the HEUR, and the neutralized or partially neutralized aminosilane is contacted with a pre-paint, which comprises a stable aqueous dispersion of polymer particles (a latex), a coalescent, a defoamer, and a surfactant. The pre-paint may also comprise one or more additional components including an opacifying pigment, an extender, a dispersant, a co-solvent, and another thickener.

The polymer particles of the latex preferably have a z-average particle size as measured by dynamic light scattering in the range of from 50 nm, more preferably from 100 nm, to 500 nm, more preferably to 300 nm. A preferred opacifying pigment is $TiO_2$, and extenders include inorganic extenders such as calcium carbonate and nepheline syenite, and organic opacifying pigment particles such as ROPAQUE™ Ultra E Opaque Polymer (a Trademark of The Dow Chemical Company or its Affiliates).

In another aspect, the present invention is a method comprising the step of contacting an aqueous admixture of a neutralized or partially neutralized aminosilane and an associative thickener, preferably a hydrophobically modified alkylene oxide urethane polymer, with a pre-paint to produce a paint composition having a concentration of the neutralized or partially neutralized aminosilane in the range of from 0.05 to 5 weight percent, based on the weight of the paint, and a concentration of the associative thickener in the range of from 0.5 to 10 weight percent, based on the weight of the paint. The composition of the present invention is useful in paint compositions for improving stain removal of coatings prepared from the paints.

EXAMPLES

In the following Examples and Table, ACRYSOL, ACUMER, TAMOL, DOWSIL, and RHOPLEX are all Trademarks of The Dow Chemical Company or its Affiliates.

Example 1—Preparation of Acid Treated HEUR-Aminosilane Admixture

ACRYSOL™ RM-3030 Rheology Modifier (76.0 g, 20.5% active in water) and ACUMER™ 9932 Polyacrylic Acid (5.0 g) were added to a vessel and mixed using a Flacktek mixer at 2900 RPM for 30 s. Pre-hydrolyzed N-2-aminoethyl-3-aminopropyltrimethoxysilane (19 g, 27% active in water) was added to the vessel followed by mixing again at 2900 RPM for 30 s. The pH of the admixture was 9.5.

Example 2—Preparation of Acid Treated HEUR-Aminosilane Admixture

The acid treated admixture was prepared substantially as described in Example 1 except that 7.6 g of ACUMER™ 9932 Polyacrylic Acid was used. The pH of the admixture was 8.8.

Example 3—Preparation of Acid Treated HEUR-Aminosilane Admixture

The acid treated admixture was prepared substantially as described in Example 1 except that 3.8 g of ACUMER™ 9932 Polyacrylic Acid was used. The pH of the admixture was 10.0.

Comparative Example 1—Preparation of HEUR-Aminosilane Admixture

ACRYSOL™ RM-3030 Rheology Modifier (76.0 g) and pre-hydrolyzed 2-aminoethyl-3-aminopropyltrimethoxysilane (19 g) were added to a vessel and mixed at 2900 RPM for 30 s. The pH of the admixture was 10.8.

Comparative Example 2—Preparation of Acid Treated HEUR-Aminosilane Admixture The acid treated admixture was prepared substantially as described in Example 1 except that 2.3 g of ACUMER™ 9932 Polyacrylic Acid (2.3 g) was used. The pH of the admixture was 10.3.

A pre-paint formulation was prepared as shown in Table 1:

TABLE 1

Pre-Paint Formulation

| Material Name | Wt (g) |
|---|---|
| Water | 96.00 |
| Propylene Glycol | 5.30 |
| TAMOL ™ 2011 Dispersant | 4.00 |
| DOWSIL ™ 8590 Defoamer | 0.50 |
| RHOPLEX VSR-1049LOE Acrylic Emulsion | 608.00 |
| Texanol Coalescent | 6.10 |
| DOWSIL ™ 67 Surfactant | 2.00 |
| Water | 140.70 |

In a first series of experiments, a visual clean check was carried out by adding admixtures of the examples and comparative examples to separate pre-paints (100 g), then preparing coatings of each sample using 3-mil drawdown applicator. Table 2 illustrates the results of a visual clean check for each sample:

TABLE 2

Visual Clean Check of Coatings from Samples over a pH Range

| Example No. | pH | Clean Check Result |
|---|---|---|
| 1 | 9.5 | Clean/Slight grit |
| 2 | 8.8 | Clean |
| 3 | 10.0 | Slight grit |
| Comp. 1 | 10.8 | Heavy grit |
| Comp. 2 | 10.3 | Medium grit |

The results illustrated in Table 2 show the criticality of acidifying the HEUR-aminosilane mixture to reduce or eliminate grit. In a separate set of experiments the order of addition of components was examined. Four paints were prepared as described:

Paint #1 was prepared by adding a portion of the admixture of Example 1 (4.60 g) into a vessel containing pre-paint (100 g) and mixing the contents with overhead lab mixer at 500 rpm for 10 min.

Paint #2 was prepared by the same procedure used to prepare Paint #1 except that an admixture from Comparative Example 1 (4.4 g) was used.

Paint #3 was prepared by adding the rheology modifier (3.50 g) into a vessel containing the pre-paint (100 g). The contents were mixed at 500 rpm for 5 min, after which time the polyacrylic acid (0.23 g) was charged into the vessel and the contents mixed for an additional 5 min. Then, the aminosilane (0.88 g) was added to the vessel and the contents mixed for an additional 5 min.

Paint #4 was prepared by adding the rheology modifier (3.50 g) into a vessel containing the pre-paint (100 g). The contents were mixed at 500 rpm for 5 min, after which time the aminosilane (0.88 g) was added to the vessel and the contents mixed for an additional 5 min.

Films were cast using a 3-mil drawdown applicator. Film appearance (clarity and gloss) were recorded and measured after each coating had completely cured.

| Property | Paint #1 | Paint #2 | Paint #3 | Paint #4 |
|---|---|---|---|---|
| pH | 9.0 | 9.4 | 9.1 | 9.6 |
| 20° gloss | 47.5 | 7.5 | 4.1 | 3.7 |
| 60° gloss | 77.1 | 29.6 | 24.4 | 21.0 |
| 85° gloss | 92.4 | 32.9 | 37.0 | 28.2 |
| Film Appearance | Clear | Heavy grit | Hazy, fine grit | Hazy, fine grit |

The results demonstrate the criticality of adding an admixture of a pre-neutralized HEUR-aminosilane. Adding the components separately gives inferior film appearance and markedly inferior gloss at all angles measured. Adding a blend of the unneutralized HEUR-aminosilane resulted in a coating with a heavily gritty film appearance. The composition of the present invention provides a simple way of adding an aminosilane to a paint to provide the benefits of stain removal, stain blocking, and corrosion resistance without the use of VOC-compromising organic solvents.

The invention claimed is:

1. A composition comprising an aqueous admixture of a) a neutralized or partially neutralized aminosilane at a concentration in the range of from 0.5 to 20 weight percent, based on the weight of water and the neutralized or partially neutralized aminosilane; and b) an associative thickener that is a hydrophobically modified alkylene oxide urethane polymer, at a concentration in the range of from 10 to 30 weight percent, based on the weight of water and the associative thickener; wherein the composition has a pH in the range of from 6 to 10; wherein the aminosilane is selected from the group consisting of N-2-aminoethyl-3-aminopropylmethyldimethoxysilane, aminopropyldimethylethoxysilane, and N-2-aminoethyl-3-aminopropyltrimethoxysilane, and hydrolyzed product thereof, wherein the aminosilane is neutralized or partially neutralized with polyacrylic acid.

2. The composition of claim 1 wherein the aminosilane is a hydrolyzed N-2-aminoethyl-3-aminopropyltrimethoxysilane.

3. A method comprising the step of contacting with a pre-paint an aqueous admixture of a neutralized or partially neutralized aminosilane and an associative thickener that is a hydrophobically modified alkylene oxide urethane polymer comprising a water soluble polymeric backbone with terminal or internal hydrophobic groups or both, wherein the admixture has a pH in the range of from 6 to 10, and the pre-paint comprises a stable aqueous dispersion of polymer particles, a coalescent, a defoamer, and a surfactant;

wherein the weight-to-weight ratio of the neutralized or partially neutralized aminosilane to the associative thickener is in the range of from 1:30 to 5:1, and wherein the aminosilane is represented by the following structure I:

I

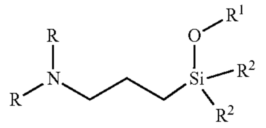

where each R is independently H, $C_1$-$C_3$-alkyl, phenyl, or 2-aminoethyl; $R^1$ is $C_1$-$C_3$-alkyl or $C(O)CH_3$; and each $R^2$ is independently H, $C_1$-$C_3$-alkyl, $C_1$-$C_3$-alkoxy, or O—$C(O)CH_3$, or a hydrolyzed product of the compound of structure I.

4. The method of claim 3 wherein the hydrophobically modified alkylene oxide urethane polymer is a hydrophobically modified ethylene oxide urethane polymer.

5. The method of claim 4 wherein the aminosilane is a pre-hydrolyzed N-2-aminoethyl-3-aminopropyltrimethoxysilane, and wherein the pre-paint further comprises one or more additional components selected from the group consisting of $TiO_2$, an extender, a dispersant, and a co-solvent.

6. The method of claim 4 wherein the admixture has a pH in the range of 8.0 to 9.7, wherein the aminosilane is N-methylaminopropyltrimethoxysilane, N-2-aminoethyl-3-aminopropylmethyldimethoxysilane, aminopropyldimethylethoxysilane, N-2-aminoethyl-3-aminopropyltrimethoxysilane, N-3-aminopropylmethyldimethoxysilane, 3-aminopropyltriethoxysilane, 3-aminopropyltrimethoxysilane, or N,N-dimethylaminopropyltrimethoxysilane, or a hydrolyzed product thereof, wherein the aminosilane is neutralized or partially neutralized with polyacrylic acid.

7. The method of claim 6 wherein the aminosilane is a hydrolyzed N-2-aminoethyl-3-aminopropyltrimethoxysilane.

* * * * *